L. R. Stone.
Hay Loader.
No 564
31,568
Patented Feb. 26, 1861.
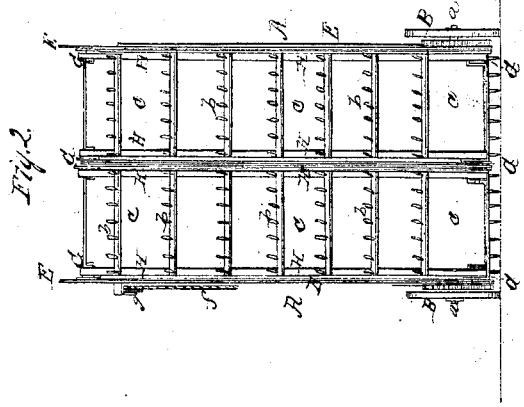
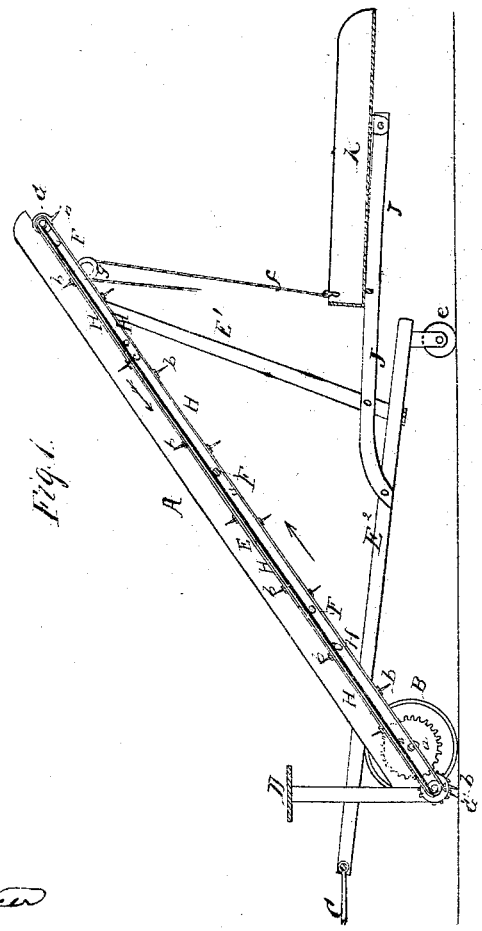
Witnesses.
J. O. Cronly
R. S. Spencer
Inventor.
L. R. Stone

UNITED STATES PATENT OFFICE.

L. R. STONE, OF OWOSSO, MICHIGAN.

IMPROVEMENT IN MACHINES FOR RAKING AND COCKING HAY.

Specification forming part of Letters Patent No. 31,568, dated February 26, 1861.

*To all whom it may concern:*

Be it known that I, L. R. STONE, of Owosso, in the county of Shiawassee and State of Michigan, have invented a new and useful Machine for Raking and Cocking Hay, and also for loading wagons or carts with hay in the field; and I do hereby declare that the following is a full, clear, and exact description thereof, reference being had to the accompanying drawings, forming a part of this specification, in which—

Figure 1 represents a vertical longitudinal section taken through my improved machine. Fig. 2 is a view looking toward the end of the machine.

Similar letters of reference indicate corresponding parts in both figures.

This invention is a self raking and cocking machine, which may follow the mowing-machine and rake the hay up into cocks or spread it out loosely for drying and curing. It may again be used for loading wagons or carts by attaching it in rear of the cart or in front of it. The hay may thus be raked up from the windrows and deposited into the cart, which operations will save much time and labor on the farm and dispense with the ordinary hay-raking and hay-making machines which are at the present time in use.

To enable those skilled in the art to fully understand my invention, I will proceed to describe its construction and operation.

A is a rectangular frame, mounted on wheels B, and having a draft-pole, C, attached to its front end.

D is the driver's seat, erected in the front end of the frame A.

E E are two parallel bars, connected by center pieces, F, through the lower part of which bars the axle $a$ of the wheels B passes; and G G are rollers placed at both ends of the bars E E, over which belts or chains H H pass said belts or chains being armed with rake-teeth $b$. The bars E E are placed in an inclined position, and their lower ends are brought very near to the surface of the ground.

Between the bars E E is an apron, $c$, which prevents the hay, as it is being elevated, from falling from the machine.

The endless rake chains or belts H H are driven by belts or suitable gearing from one of the traction-wheels B, or from both wheels, and the bars and apron $c$ are kept in a proper position by a brace bar or bars, E′, as shown by the drawings, which connects with horizontal bars E², proceeding out in rear of wheels B, and resting on caster-wheels $e$. From the rear ends of bars E² and E′ proceed out two stationary arms, J J, upon which is hung a receiving-box, K, which may be tilted over by means of a cord, $f$, attached to its rear end, and passing up and over a roller or pulley, $g$, on one of the bars E, as clearly shown by Fig. 1.

From this description it will be seen that when the machine is drawn over the hay-field the loose hay may be elevated to the top of the inclined apron, and then deposited into the receiving-box K, from which it may be dropped on the ground at intervals by tilting this box, and the hay thus deposited will be in the form of cocks. By removing the tilting box the hay will be evenly scattered upon the ground as the machine is drawn along, the machine thus serving as a spreader; or, if a wagon is placed under the upper end of the apron, the hay will be discharged into the wagon and the latter loaded. The machine thus serves to rake, cock, and load the hay, as desired.

Having thus described my invention, what I claim as new, and desire to secure by Letters Patent, is—

The arrangement of the levers J J, tilting box K, bars E′ E², wheels B B, rollers G G, belts H H, and apron $c$ upon the bars E E, and caster-wheels $e$, the whole being constructed and operating substantially as and for the purpose herein shown and described.

L. R. STONE.

Witnesses:
IRA MERELL,
M. W. RICHARDS.